United States Patent [19]
Ohara

[11] Patent Number: 5,901,250
[45] Date of Patent: * May 4, 1999

[54] DIGITAL CODING APPARATUS AND DIGITAL CODING/DECODING APPARATUS

[75] Inventor: Kazutake Ohara, Osaka, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/501,731

[22] Filed: Jul. 12, 1995

[30] Foreign Application Priority Data

Jul. 13, 1994 [JP] Japan ................................. 6-160986

[51] Int. Cl.[6] ...................................... H04N 1/41
[52] U.S. Cl. ...................... 382/246; 358/261.4; 358/432; 382/245
[58] Field of Search ................................ 358/430, 426, 358/427, 261.4, 261.3, 432; 382/246, 245, 251, 238, 239; 341/67; 348/405, 417, 422; H04N 1/41

[56] References Cited

U.S. PATENT DOCUMENTS

| | | | |
|---|---|---|---|
| 5,138,316 | 8/1992 | Konishi | 358/261.1 |
| 5,173,695 | 12/1992 | Sun et al. | 341/67 |
| 5,184,229 | 2/1993 | Saito et al. | 358/427 |
| 5,216,518 | 6/1993 | Yamagami | 358/426 |
| 5,304,995 | 4/1994 | Dachiku | 341/67 |
| 5,561,422 | 10/1996 | Kim | 341/67 |

FOREIGN PATENT DOCUMENTS

| | | |
|---|---|---|
| 0 383 678 | 8/1990 | European Pat. Off. . |
| 0 447 203 | 9/1991 | European Pat. Off. . |
| 0 447 234 | 9/1991 | European Pat. Off. . |
| 0 469 835 | 2/1992 | European Pat. Off. . |
| 0 568 046 | 11/1993 | European Pat. Off. . |
| 5-300379 | 11/1993 | Japan . |
| 6-164417 | 6/1994 | Japan . |
| 6-165112 A | 6/1994 | Japan . |
| 8-9373 | 1/1996 | Japan . |

OTHER PUBLICATIONS

Bolton, M.: "A Complete Single–Chip Implemenation of the JPEG Image Compression Standard", Proceedings of the Custom Integrated Circuits Conference, San Diego, May 12–15, 1991.

*Primary Examiner*—Kim Yen Vu
*Attorney, Agent, or Firm*—McDermott, Will & Emery

[57] ABSTRACT

In a digital coding apparatus or a digital coding and decoding apparatus for image data compression and expansion by means of Huffman coding, a Huffman coding circuit converts a combination of ZERO RUN and VALUE into a variable-length code. A code length calculation circuit has an AC code length table for prestoring variable-length codes and their code lengths in corresponding relationship. The code length calculation circuit inputs not a ZERORUN-VALUE combination but a variable-length code from the Huffman coding circuit, thereby calculating from the variable-length code inputted its code length according to the AC code length table. The present invention can provide a downsized AC code length table in comparison with a conventional one that stores ZERORUN-VALUE combinations and code lengths in corresponding relationship.

18 Claims, 12 Drawing Sheets

| | FUNCTION | INPUT | OUTPUT | VLC/VLD |
|---|---|---|---|---|
| T1 | VARIABLE-LENGTH CODE ENCODE TABLE | (ZERO RUN, VALUE) | VARIABLE-LENGTH CODE | VLC |
| T3 | CODE LENGTH TABLE | VARIABLE-LENGTH CODE | CODE LENGTH | VLC, VLD |
| T4 | VARIABLE-LENGTH CODE DECODE TABLE | VARIABLE-LENGTH CODE | (ZERO RUN, VALUE) | VLD |

Fig.5

| (ZERO RUN) (VALUE) | VARIABLE-LENGTH CODE | CODE LENGTH | THE NUMBER OF BITS REQUIRED TO FIND A CODE LENGTH |
|---|---|---|---|
| (0,255) | $+++++++++++\boxed{1\,1\,1\,1}$ | 16 (MAX) | 5 |
| (10,0) | $+++++++++\boxed{0\,1\,1\,1}$ | 13 | 5 |
| (1,4) | $+++++++++\boxed{1\,0\,1\,1}$ | 13 | 5 |
| (5,0) | $++++++++\boxed{0\,0\,1\,1}$ | 12 | 5 |
| (0,1) | $\boxed{0\,0}$ | 3 (MIN) | 2 |
| (0,2) | $\boxed{0\,1\,0}$ | 4 | 3 |

| VARIABLE-LENGTH CODE | CODE LENGTH |
|---|---|
| 0 0 | 3 |
| 0 1 0 | 4 |

Fig.6(c)

| A3 | A2 | A1 | Y3 | Y2 | Y1 |
|---|---|---|---|---|---|
| — | 0 | 0 | 0 | 1 | 1 |
| 0 | 1 | 0 | 1 | 0 | 0 |

Fig.6(d)

$Y_3 = \overline{A_3} \cdot A_2 \cdot \overline{A_1}$ $Y_2 = \overline{A_2} \cdot \overline{A_1}$ $Y_1 = \overline{A_2} \cdot \overline{A_1}$ Fig.9
PRIOR ART

| | FUNCTION | INPUT | OUTPUT | VLC/VLD |
|---|---|---|---|---|
| T1 | VARIABLE-LENGTH CODE ENCODE TABLE | (ZERO RUN, VALUE) | VARIABLE-LENGTH CODE | VLC |
| T2 | CODE LENGTH TABLE | (ZERO RUN, VALUE) | CODE LENGTH | VLC |
| T3 | CODE LENGTH TABLE | VARIABLE-LENGTH CODE | CODE LENGTH | VLD |
| T4 | VARIABLE-LENGTH CODE DECODE TABLE | VARIABLE-LENGTH CODE | (ZERO RUN, VALUE) | VLD |

DIGITAL CODING APPARATUS AND DIGITAL CODING/DECODING APPARATUS

BACKGROUND OF THE INVENTION

1. Field of the Invention

This invention relates generally to a digital coding apparatus and to a digital coding/decoding apparatus. More specifically the present invention pertains to a technique of reducing the size of logical tables for use by these apparatus.

2. Art Background

Figure 10:
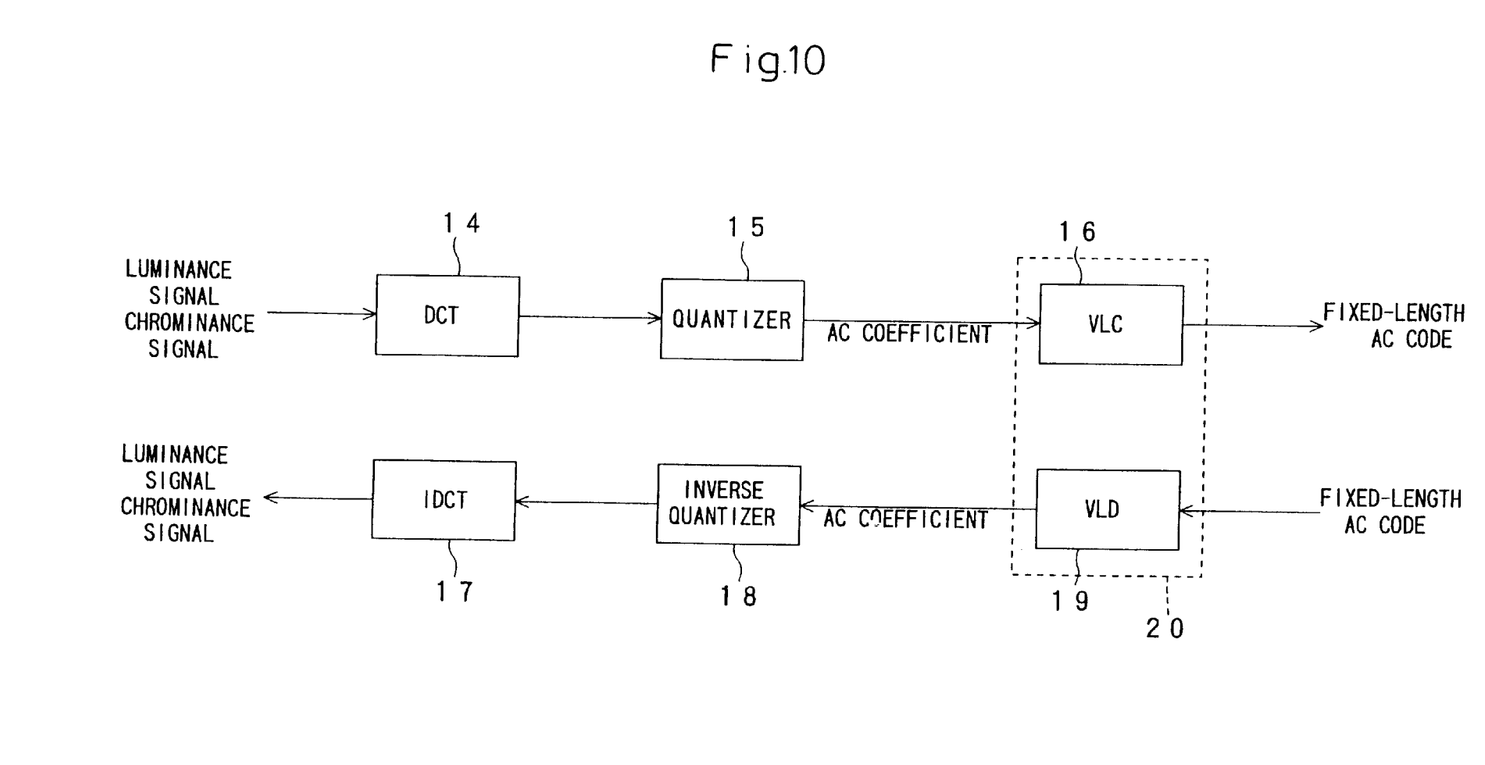
FIG. 10 shows an entire organization of a conventional digital coding/decoding apparatus.

Japanese Patent Application, published under Pub. No. 6-165112, shows a digital coding/decoding apparatus for image data compression and expansion. FIG. 10 shows a conventional digital coding/decoding apparatus. 14 is a discrete cosine transform circuit (DCT). 15 is a quantizer. 16 is a variable-length coder (VLC). 17 is an inverse discrete cosine transform circuit (IDCT). 18 is an inverse quantizer. 19 is a variable-length decoder (VLD). 20 is a circuit made up of the VLC 16 and the VLD 19.

The DCT 14 receives either an image data luminance signal or an image data chrominance signal and performs a discrete cosine transform on the received signal, a result of the discrete cosine transform operation being put out in the form of an AC coefficient. The quantizer 15 quantizes an output of the DCT 14, a result of the quantization operation being put out. The VLC 16 transforms an output of the quantizer 15 into a variable-length Huffman code for further data compression. This variable-length AC code is padded to a fixed-length code. This fixed-length code is put out to a recording device (not shown) located outside the apparatus.

The VLD 19 receives a fixed-length AC code (i.e., a Huffman code) from a recording device (not shown in the figure) located outside the apparatus, extracts a variable-length AC code from the received fixed-length AC code, and decodes and expands the variable-length Huffman code to put out an AC coefficient. The inverse quantizer 18 inverse-quantizes an output of the VLD 19, a result of the inverse-quantization operation being put out. The IDCT 17 performs an inverse discrete cosine transform on an output of the inverse quantizer 18, to obtain either an image data luminance signal or an image data chrominance signal. Such an obtained signal is fed to an image display unit (e.g., a CRT) located outside the apparatus.

Figure 7:
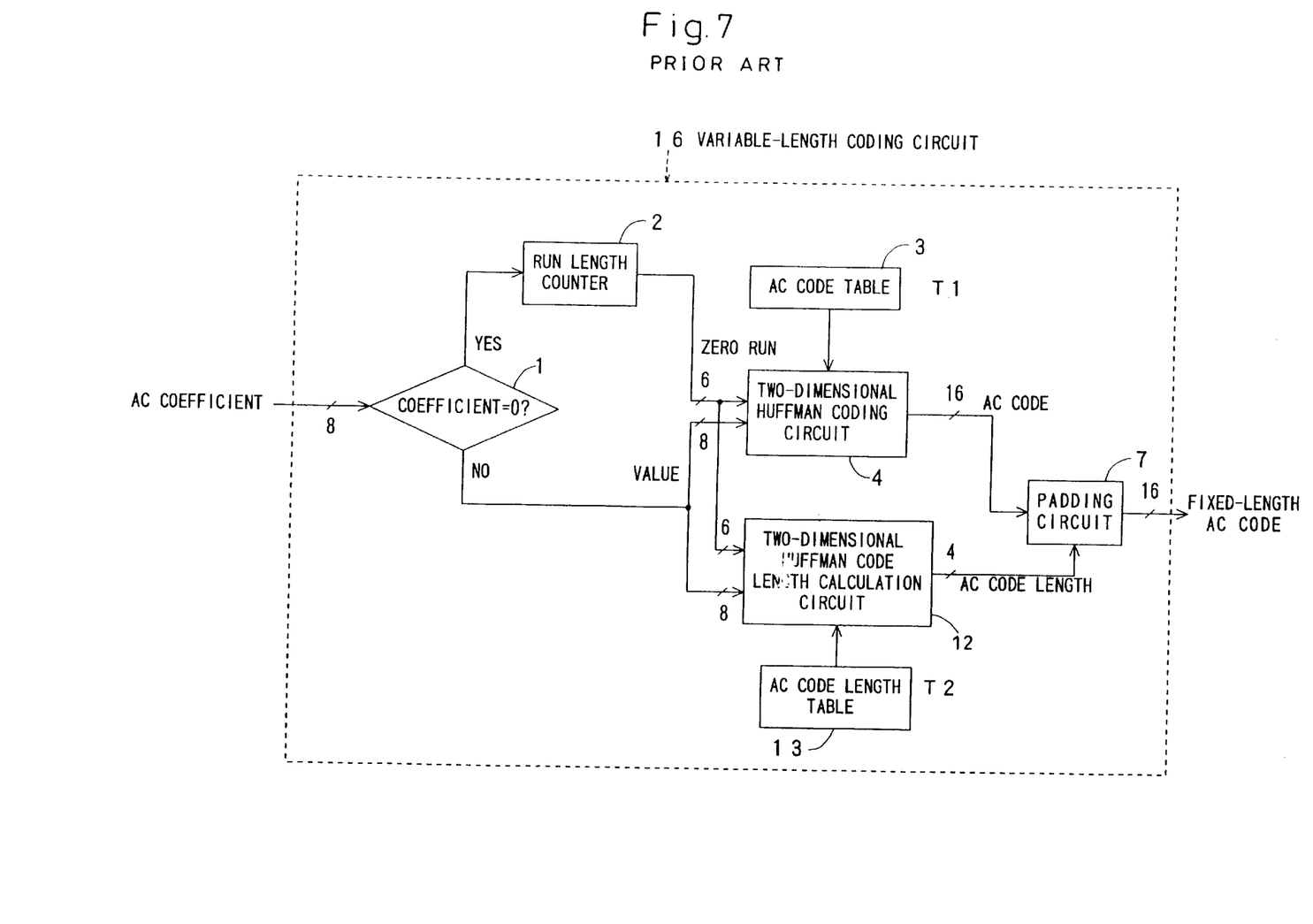
FIG. 7 is a diagram showing a conventional variable-length coding circuit.

FIG. 7 schematically shows a circuit organization of the VLC 16 of FIG. 10. 1 is a decision circuit. 2 is a run length counter. 3 is an AC code table. 4 is a two-dimensional Huffman coding circuit. 7 is a padding circuit. 12 is a code length calculation circuit. 13 is an AC code length table.

Figure 11:
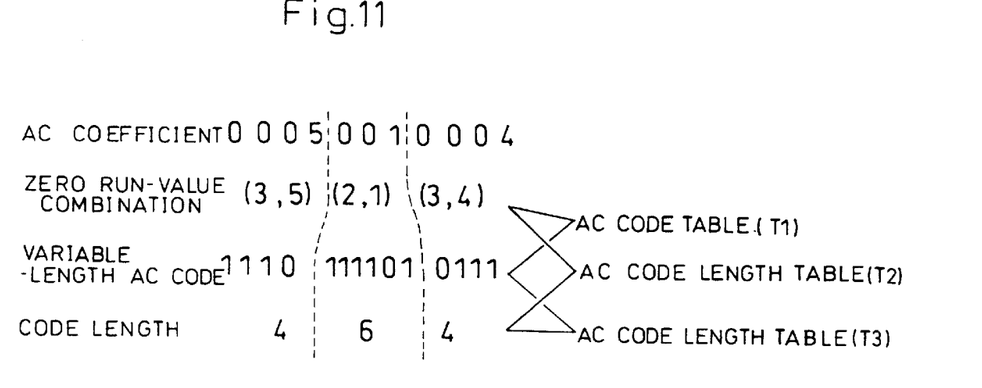
FIG. 11 shows corresponding relationships between AC coefficients, ZERORUN-VALUE combinations, variable-length AC codes, and code lengths thereof.
Figure 12:
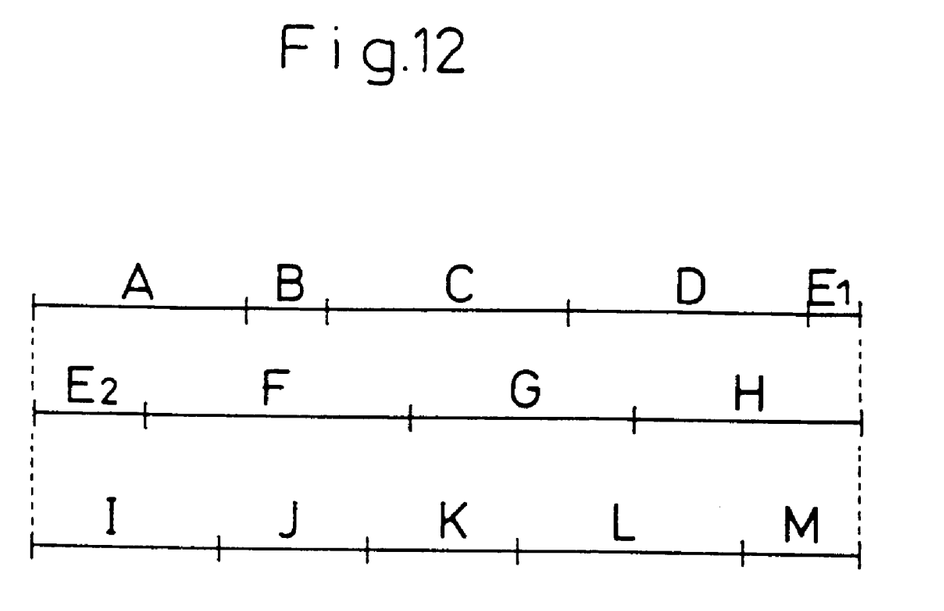
FIG. 12 is a diagram useful in understanding fixed-length AC codes.

As shown in FIG. 11, the decision circuit 1 receives a sequence of AC coefficients each of which has either a value of zero (zero value) or a value other than zero (nonzero value). Upon receipt of an AC coefficient the decision circuit 1 determines whether the AC coefficient received has a zero value or a nonzero value. The run length counter 2 counts the number of times the decision circuit 1 successively receives a zero-valued AC coefficient (i.e., the number of consecutive AC coefficients that are all determined by the run length counter 2 having a zero value). Whereas a nonzero-valued AC coefficient is defined as VALUE, the number of consecutive zero-valued AC coefficients is defined as ZERO RUN (ZERORUN). ZERORUN and VALUE combinations are shown in FIG. 11. The AC code table 3 prestores ZERORUN-VALUE combinations and variable-length AC codes in corresponding relationship. Additionally the AC code length table 13 prestores the ZERORUN-VALUE combinations and code lengths of the variable-length AC codes in corresponding relationship. Each ZERORUN-VALUE combination is fed to the two-dimensional Huffman coding circuit 4 and to the code length calculation circuit 12. Based on the AC code table 3, the Huffman coding circuit 4 puts out a variable-length AC code corresponding to the ZERORUN-VALUE combination received. Based on the AC code length table 13, the code length calculation circuit 12 puts out a code length of a variable-length AC code corresponding to the ZERORUN-VALUE combination received. The padding circuit 7 receives the variable-length AC code from the two-dimensional Huffman coding circuit 4 and the code length from the code length calculation circuit 12. Then the padding circuit 7 pads these data items, received from the Huffman coding circuit 4 and the calculation circuit 12, to a fixed-length AC code (see FIG. 12). FIG. 12 depicts an example of padding thirteen variable-length AC codes A to M into three fixed-length codes. A part of the variable-length AC code E, i.e., E1, is padded to the first of the three fixed-length codes, and the remaining part of the variable-length AC code E, i.e., E2, is padded to the head end of the second of the three fixed-length codes.

Figure 8:
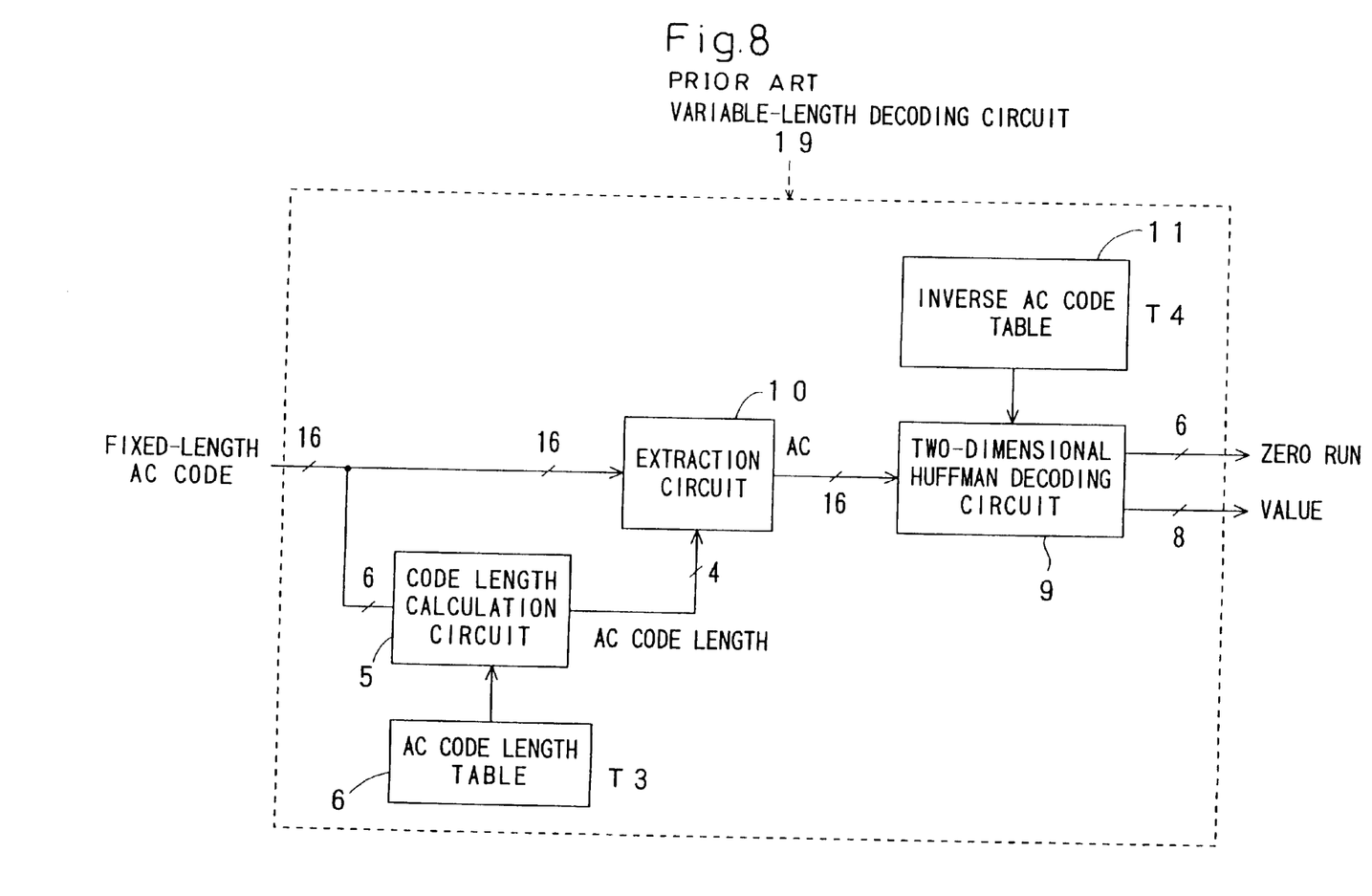
FIG. 8 is a diagram showing a conventional variable-length decoding circuit.

FIG. 8 illustrates a circuit organization of the VLD 19. 5 is a code length calculation circuit. 6 is an AC code length table. 9 is a two-dimensional Huffman decoding circuit. 10 is an extraction circuit. 11 is an inverse AC code table.

When the VLD 19 receives a fixed-length code, the code length calculation circuit 5 finds from the fixed-length AC code a code length of a variable-length AC code contained in the fixed-length AC code, according to the AC code length table 6. The extraction circuit 10 receives a fixed-length AC code and the code length found by the code length calculation circuit 5 and extracts a variable-length AC code from the fixed-length code. Based on the inverse AC code table 11, the two-dimensional Huffman decoding circuit 9 transforms the extracted variable-length AC code into a ZERORUN-VALUE combination.

Figure 9:
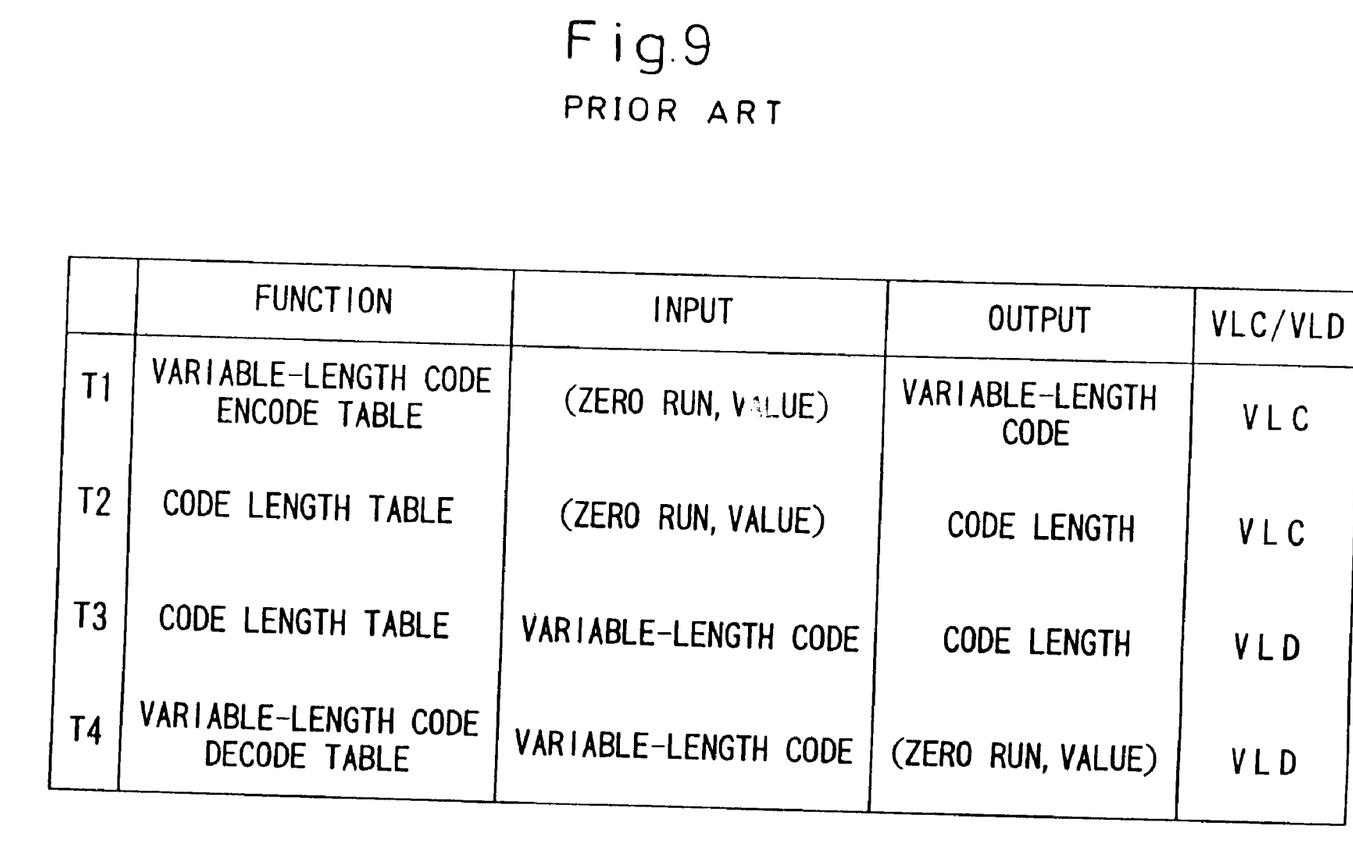
FIG. 9 is a diagram useful in understanding logical tables for use by conventional variable-length coding and decoding circuits.

FIG. 9 is a list of different types of logical tables for use by the VLC 16 and the VLD 19 of FIG. 10, namely a variable-length-code encode table T1, a code length table T2, a code length table T3, and a variable-length-code decode table T4. TABLE T1, which corresponds to the AC code table 3, takes in a ZERORUN-VALUE combination and puts out a variable-length code. TABLE T2, which corresponds to the AC code length table 13, takes in a ZERORUN-VALUE combination and puts out a code length. TABLE T3, which corresponds to the AC code length table 6, takes in a variable-length code and puts out a code length thereof. TABLE T4, which corresponds to the inverse AC code table 11, takes in a variable-length code and puts out a ZERORUN-VALUE combination.

The above-described conventional coding/decoding apparatus, however, presents some problems. For the case of a code length table (maximum ZERORUN: 63; maximum VALUE: 255; maximum code length: 16), such a code length table, when formed by RAMs or ROMs, requires a structure of 64×256=16384 words including AC codes without ZERORUN and AC codes without VALUE. If one word is made up of five bits on the average, then a total of 16384×5=81920 bits is required. This increases the table size, resulting in increasing the size of peripheral circuits of a code length table. Much more power is dissipated.

Figure 13:
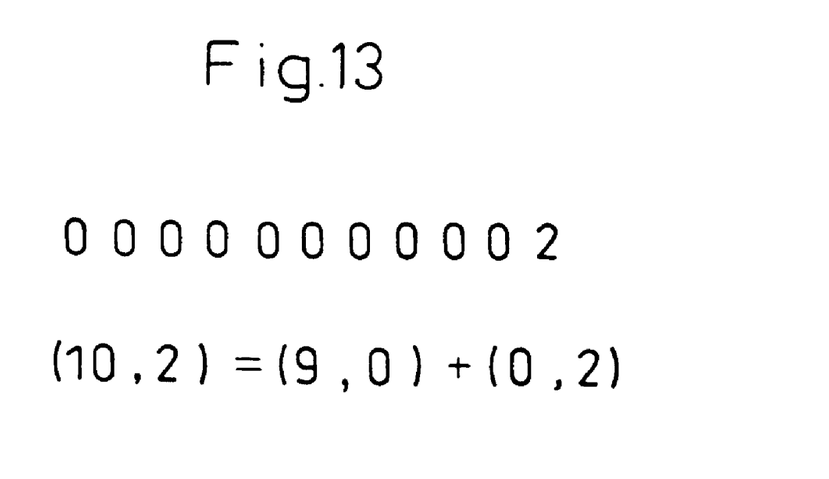
FIG. 13 is a diagram describing a conventional way of reducing the size of logical tables.

There is a conventional way of reducing the size of logical tables which can be expressed as follows:

$$(z, v) = (z-1, 0) + (0, v)$$

where z=ZERORUN and v=VALUE. For example, as shown in FIG. 13, if z=10 and v=2, then division is made as follows.

$$(10, 2)=(9, 0)+(0, 2)$$

This method can provide a logical table of 62+255=317 words. 317 words is still large for the size of logical tables.

SUMMARY OF THE INVENTION

Bearing in mind the foregoing problems with the prior art techniques, the present invention was made. A general object of the present invention is therefore to provide a downsized code length table for use in a variable-length coder (VLC).

The present invention provides an improved code length table structure capable of storing variable-length codes and code lengths thereof in corresponding relationship instead of storing ZERORUN-VALUE combinations and code lengths in corresponding relationship.

The present invention provides a digital coding apparatus comprising:

- an orthogonal transform circuit for performing an orthogonal transform on data to find a great number of transform coefficients, each of the transform coefficients having either a value of zero or a value other than zero;
- a variable-length coding circuit for converting transform coefficients from the orthogonal transform circuit into a variable-length code, for padding the variable-length code to a fixed-length code, and for providing the fixed-length code to outside the digital coding apparatus;
- the variable-length coding circuit including:
  - a first logical table for storing combinations of the numbers of consecutive zero-valued transform coefficients and nonzero-valued transform coefficients and variable-length codes in corresponding relationship;
  - a coding circuit for receiving in sequence transform coefficients from the orthogonal transform circuit, and for converting, based on the first logical table, a combination of the number of consecutive zero-valued transform coefficients and a nonzero-valued transform coefficient of the received transform coefficients, into a variable-length code;
  - a second logical table for storing variable-length codes and code lengths thereof in corresponding relationship;
  - a code length calculation circuit for receiving a variable-length code from the coding circuit and for calculating, based on the second logical table, a code length of the received variable-length code;
  - a padding circuit for receiving a variable-length code from the coding circuit and a code length from the code length calculation circuit and for padding, based on the received code length, the received variable-length code to a fixed-length code.

The present invention provides a digital coding and decoding apparatus comprising:

- an orthogonal transform circuit for performing an orthogonal transform on data to find a great number of transform coefficients, each of the transform coefficients having either a value of zero or a value other than zero;
- a variable-length coding circuit for converting transform coefficients from the orthogonal transform circuit into a variable-length code, for padding the variable-length code to a fixed-length code, and for providing the fixed-length code to outside the digital coding and decoding apparatus;
- a variable-length decoding circuit for receiving a fixed-length code from outside the digital coding and decoding apparatus and for converting the received fixed-length code into a great number of transform coefficients, each of the transform coefficients having either a value of zero or a value other than zero;
- an inverse orthogonal transform circuit for performing an inverse orthogonal transform on a zero-valued transform coefficient or a nonzero-valued transform coefficient from the variable-length decoding circuit;
- the variable-length coding circuit including:
  - a first logical table for storing combinations of the numbers of consecutive zero-valued transform coefficients and nonzero-valued transform coefficients and variable-length codes in corresponding relationship;
  - a coding circuit for receiving in sequence transform coefficients from the orthogonal transform circuit, and for converting, based on the first logical table, a combination of the number of consecutive zero-valued transform coefficients and a nonzero-valued transform coefficient of the received transform coefficients, into a variable-length code;
  - a second logical table for storing variable-length codes and code lengths thereof in corresponding relationship;
  - a code length calculation circuit for receiving a variable-length code from the coding circuit and for calculating, based on the second logical table, a code length of the received variable-length code;
  - a padding circuit for receiving a variable-length code from the coding circuit and a code length from the code length calculation circuit and for padding, based on the received code length, the received variable-length code to a fixed-length code;
- the variable-length decoding circuit including:
  - a third logical table for storing variable-length codes and code lengths thereof in corresponding relationship;
  - a code length calculation circuit for receiving a fixed-length code from outside the digital coding and decoding apparatus and for calculating, based on the third logical table, a code length of a variable-length code contained in the received fixed-length code;
  - an extraction circuit for receiving a fixed-length code from outside the digital coding and decoding apparatus and a code length from the code length calculation circuit and for extracting, based on the received code length, a variable-length code from the received fixed-length code;
  - a fourth logical table for storing variable-length codes and combinations of the numbers of consecutive zero-valued transform coefficients and nonzero-valued transform coefficients in corresponding relationship;
  - a decoding circuit for converting, based on the fourth logical table, a variable-length code from the extraction circuit into zero- and nonzero-valued transform coefficients.

It is preferable that in the above-described digital coding and decoding apparatus the code length calculation circuit of the variable-length coding circuit serves also as the code length calculation circuit of the variable-length decoding circuit and the second logical table serves also as the third logical table.

In accordance with the present invention, the second logical table (the code length table) stores variable-length codes encoded by the coding circuit and code lengths thereof in corresponding relationship. Accordingly this makes the second logical table of the present invention small in size in comparison with a conventional one that stores ZERORUN-VALUE combinations and code lengths in corresponding relationship. Additionally the size of peripheral circuits of a logical table can be reduced and less power consumption is achieved.

In accordance with the present invention, the VLC and the VLD share a code length calculation circuit, and a logical table for use by the code length calculation circuit is also shared between the VLC and the VLD. This provides a smaller logical table. Accordingly the size of peripheral circuits of a logical table can be reduced and less power consumption is achieved.

These and other objects and advantages of the present invention will become apparent to those skilled in the art upon consideration of the accompanying specification, claims and drawings.

BRIEF DESCRIPTION OF THE DRAWINGS

FIG. 6 is comprised of 6a–6d, wherein

DETAILED DESCRIPTION OF THE INVENTION

Preferred embodiments of the present invention are described by making reference to the accompanying drawing figures.

EMBODIMENT 1

Figure 1:
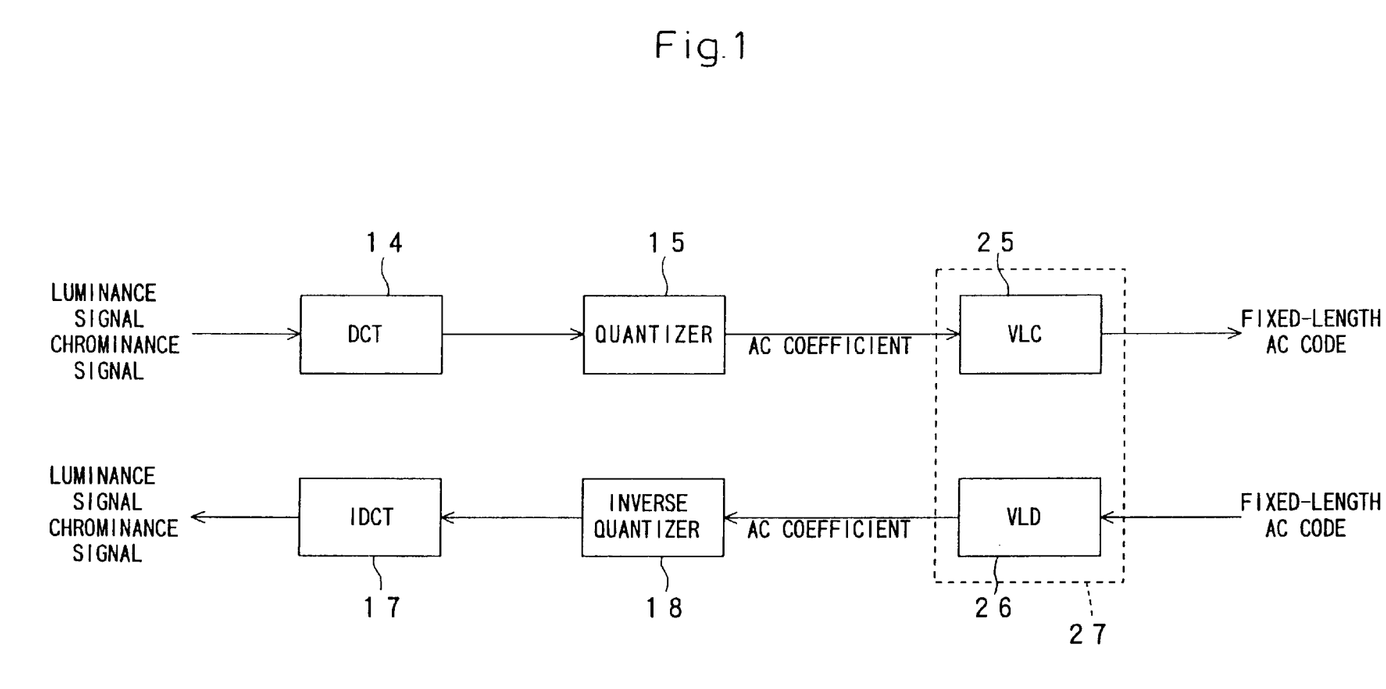
FIG. 1 is a block diagram showing an entire organization of a digital coding/decoding apparatus in accordance with the present invention.
Figure 2:
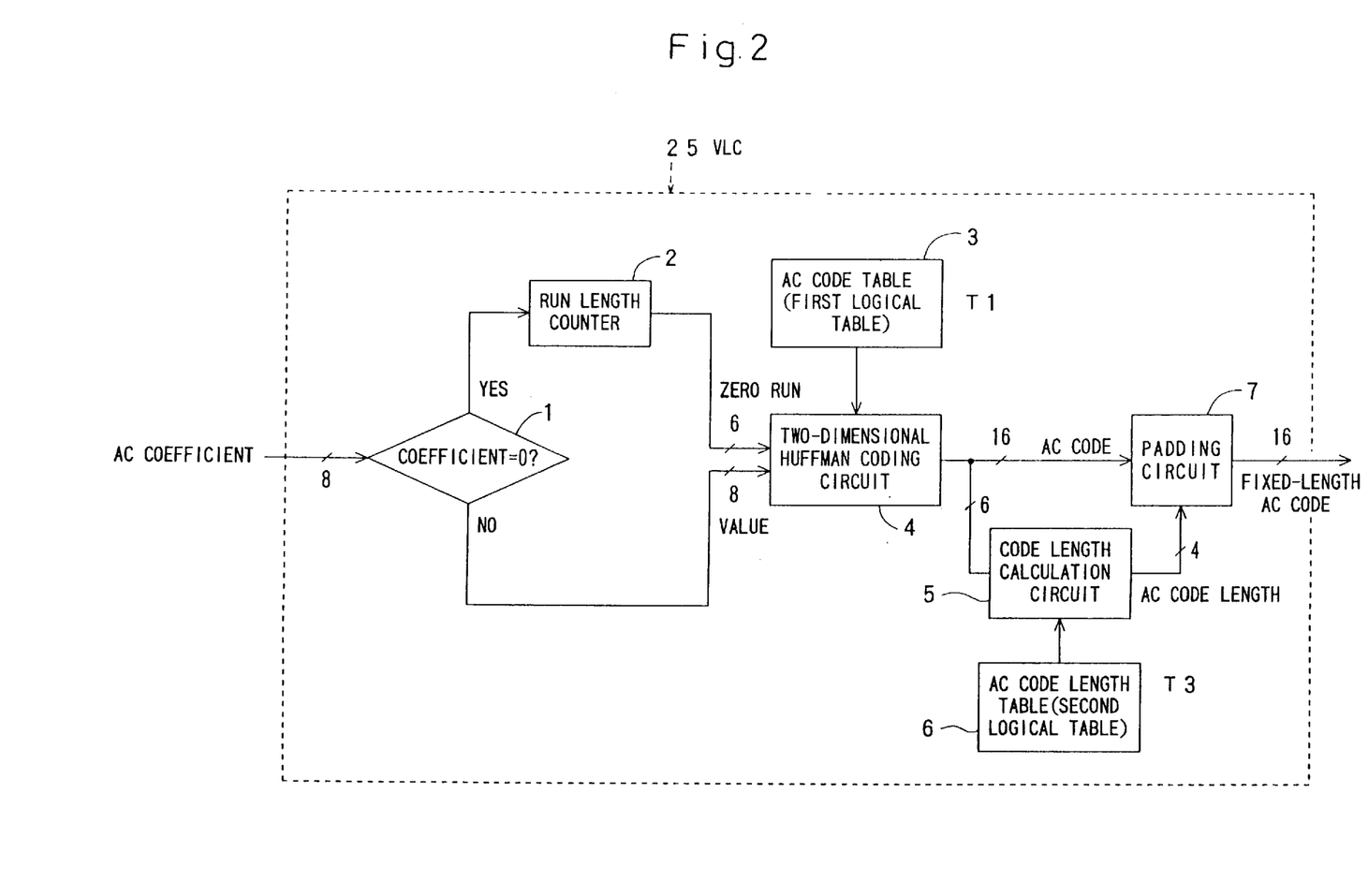
FIG. 2 is a diagram showing a variable-length coding circuit in accordance with a first embodiment of the present invention.

A first digital coding apparatus of the present invention capable of performing image data compression is now described by making reference to FIGS. 1 and 2.

14 is a discrete cosine transform circuit (DCT) that is an orthogonal transform circuit for reducing the amount of information by making use of signal power distribution bias. 15 is a quantizer. 25 is a variable-length coder (VLC). 17 is an inverse discrete cosine transform circuit (IDCT) which is an inverse orthogonal transform circuit. 18 is an inverse quantizer. 26 is a variable-length decoder (VLD). 27 is a circuit made up of the VLC 25 and the VLD 26.

The DCT 14 receives either an image data luminance signal or an image data chrominance signal and performs a discrete cosine transform on the received signal, a result of the discrete cosine transform operation being put out in the form of an AC coefficient. The quantizer 15 quantizes such an output of the DCT 14, a result of the quantization operation being put out. The VLC 25 transforms such an output of the quantizer 15 into a variable-length Huffman code for further data compression. This variable-length AC code is padded to a fixed-length code. This fixed-length code is put out to a recording device (not shown) located outside the apparatus.

The VLD 26 receives a fixed-length AC code (i.e., a Huffman code) from a recording device (not shown in the figure) located outside the apparatus, extracts a variable-length AC code from the received fixed-length AC code, and decodes and expands the variable-length Huffman code to put out an AC coefficient. The inverse quantizer 18 inverse-quantizes such an output of the VLD 26, a result of the inverse-quantization operation being put out. The IDCT 17 performs an inverse discrete cosine transform on an output of the inverse quantizer 18, to obtain either an image data luminance signal or an image data chrominance signal. Such an obtained signal is fed to an image display unit (e.g., a CRT) located outside the apparatus.

The digital coding apparatus of the present embodiment comprises the DCT 14, the quantizer 15, and the VLC 25.

FIG. 2 is a diagram showing an internal organization of the VLC 25. 1 is a decision circuit. 2 is a run length counter. 3 is an AC code table acting as a first logical table. 4 is a two-dimensional Huffman coding circuit. 7 is a padding circuit. 5 is a code length calculation circuit. 6 is an AC code length table acting as a second logical table.

The decision circuit 1 receives from the quantizer 15 of FIG. 1 an AC coefficient. Then the decision circuit 1 determines whether an AC coefficient received has a value of zero (zero value) or a value other than zero (nonzero value). The run length counter 2 counts the number of times the decision circuit 1 successively receives a zero-valued AC coefficient (i.e., the number of consecutive AC coefficients that are all determined by the run length counter 2 having a zero value). Whereas a nonzero-valued AC coefficient is defined as VALUE, the number of consecutive zero-valued AC coefficients is defined as ZERO RUN (ZERORUN).

When ZERORUN-VALUE combinations are obtained as shown in FIG. 11, each ZERORUN-VALUE combination is fed to the two-dimensional Huffman coding circuit 4.

The AC code table 3 (i.e., the first logical table) prestores ZERORUN-VALUE combinations and variable-length AC codes in corresponding relationship (see FIG. 11). The AC code table 3 corresponds to the variable-length-code encode table T1. Upon receipt of a certain ZERORUN-VALUE combination the two-dimensional Huffman coding circuit 4 provides a corresponding variable-length AC code according to the AC code table 3.

The AC code length table 6 (i.e., the second logical table) prestores variable-length AC codes and code lengths thereof in corresponding relationship (see FIG. 11). More specifically the AC code length table 6 prestores decoded values of only plural low-order bits of variable-length AC codes and code lengths thereof in corresponding relationship (see FIG. 5). The AC code length table 6 corresponds to the code length table T3 of FIG. 4. Upon receipt of a certain variable-length AC code from the two-dimensional Huffman coding circuit 4, the code length calculation circuit 5 provides a corresponding code length according to the AC code length table 6.

The padding circuit 7 receives a variable-length AC code from the two-dimensional Huffman coding circuit 4 and a code length from the code length calculation circuit 5 and pads these data items received to a fixed-length AC code (see FIG. 12).

Figure 4:
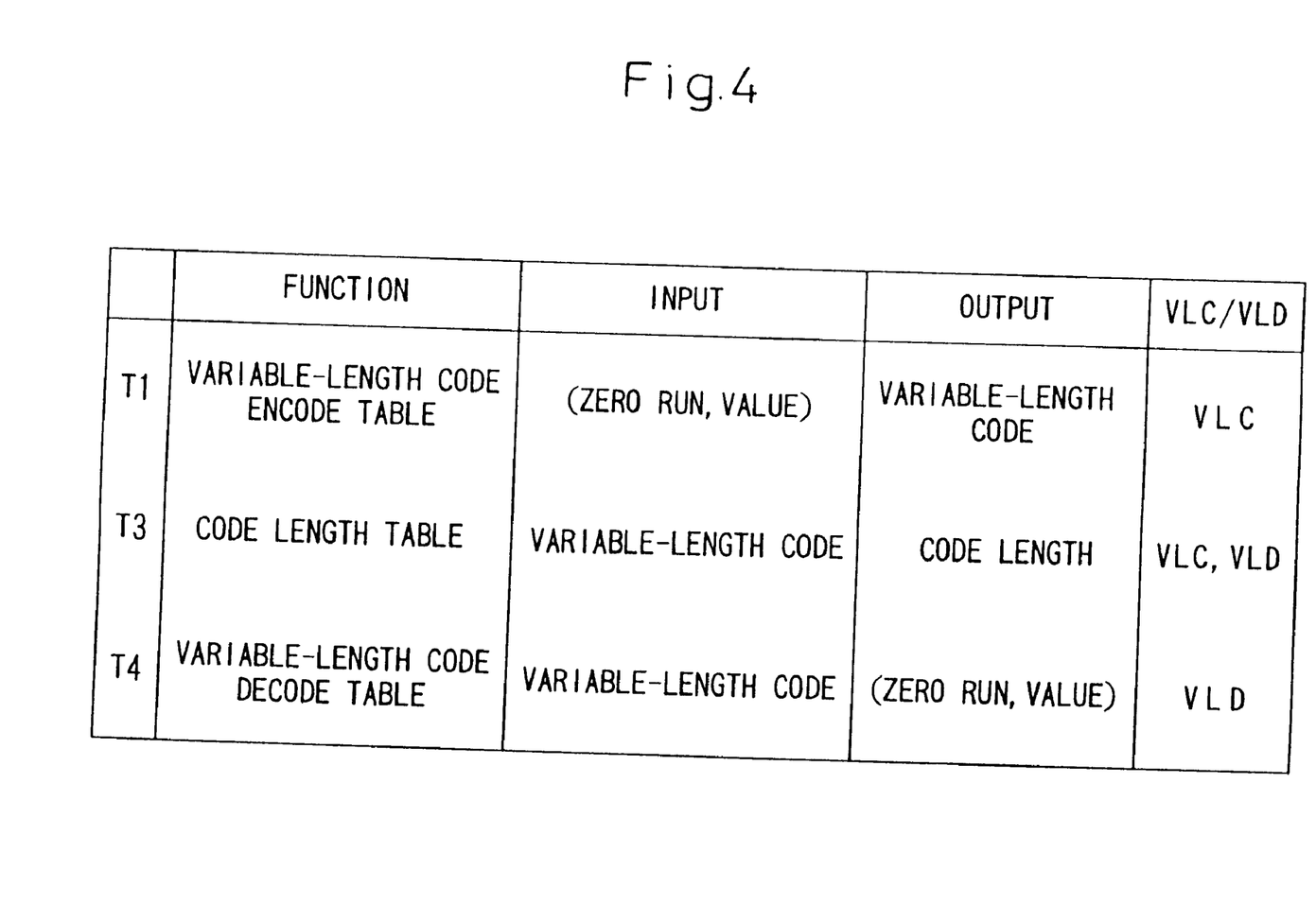
FIG. 4 is a diagram useful in understanding individual logical tables for use by variable-length coding and decoding circuits in accordance with the present invention.
Figure 5:
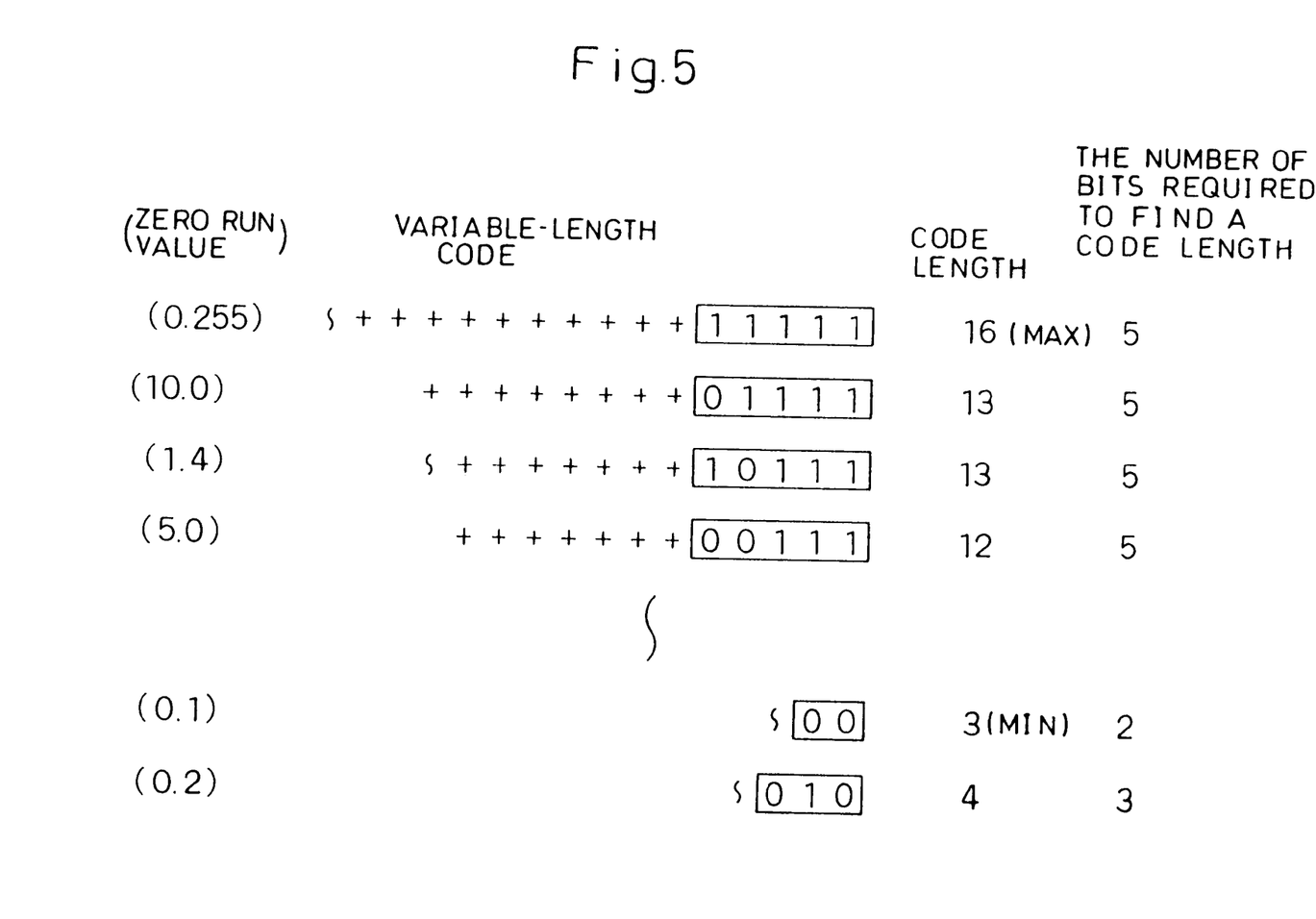
FIG. 5 is a diagram useful in understanding corresponding relationships of variable-length codes versus code lengths thereof, in a variable-length coding circuit.

In accordance with the present embodiment, the AC code length table 6, which is used when the code length calculation circuit 5 calculates a code length, is a table for storing variable-length AC codes and code lengths thereof in corresponding relationship (see the FIG. 4 code length table T3). In comparison with a conventional code length table that stores ZERORUN-VALUE combinations and code lengths in corresponding relationship, the AC code length table 6 is smaller in size. As a result, the size of peripheral circuits of the AC code length table 6 can be reduced to a greater extent, and unnecessary access is no longer made, and less power is consumed.

The above-noted effects of the present embodiment are explained in detail. A conventional VLC uses a ZERORUN-VALUE combination as an input signal of a code length calculation circuit, so that such a VLC requires a code length table that takes in a ZERORUN-VALUE combination and puts out a code length. For the case of a code length table (maximum ZERORUN: 63; maximum VALUE: 255; maximum code length: 16), this code length table, when formed with RAMs or ROMs, requires a size of 64×256=16384 words including AC codes without ZERORUN and AC codes without VALUE. If one word is made up of five bits on the average, then a total of 18384×5=81920 bits is required. This increases the table size.

As described previously, there is a conventional method of reducing the size of logical tables which can be expressed as follows:

$$(z, v) = (z-1, 0) + (0, v)$$

where z=ZERORUN and v=VALUE.

This method can provide a logical table of 62+255=317 words. However, 317 words is still large for the size of logical tables.

The present embodiment provides a code length table capable of downsizing circuits and accomplishing less power dissipation.

Additionally the code length table T3 used by the code length calculation circuit 5 is a table capable of storing arts of variable-length codes and code lengths thereof in corresponding relationship. This can downsize a code length table and provide fast calculations.

The effects of the present invention are explained in detail. For example, in FIG. 5 a maximum code length is sixteen bits and a minimum code length is three bits. In order to find the code length of an AC code, there is no need to decode the entire AC code. Decoding only the low-order five bits of the AC code is sufficient to find the code length. In this case, a code length table requires a 32-word size at most. In other words, the present invention can provide a 32-word code length table versus a 16384-word code length table for the prior art technique when a code length table is not divided (i.e., a reduction in size of about 99.8%). Further the present invention can provide, when a code length table is divided, a 32-word code length table versus a 317-word code length table for the prior art technique (i.e., a reduction in size of about 90%). Theoretically the number of words required should be equal to the number of code length types. In an example of FIG. 5 there are fourteen types of code lengths (from a 3-bit code length to a 16-bit code length). Therefore the number of words required is fourteen. With the present code length table added to the output of the variable-length encode table T1, a code length can be found. This eliminates the need for providing peripheral circuits of a code length table, thereby reducing the entire circuit size.

Figure 6A:
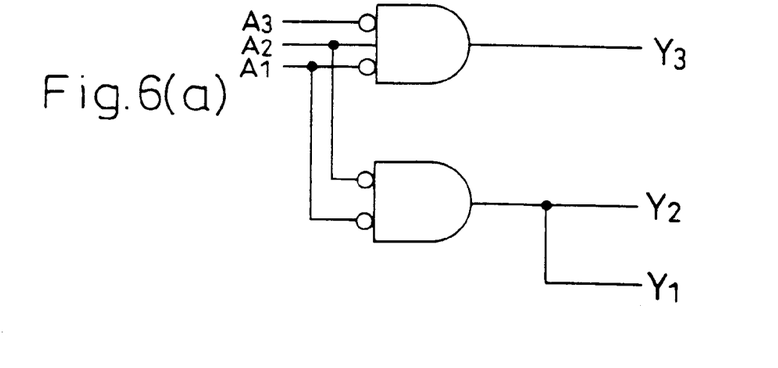
FIG. 6a is a diagram showing an embodiment of an AC code length table in accordance with the present invention.
Figure 6B:
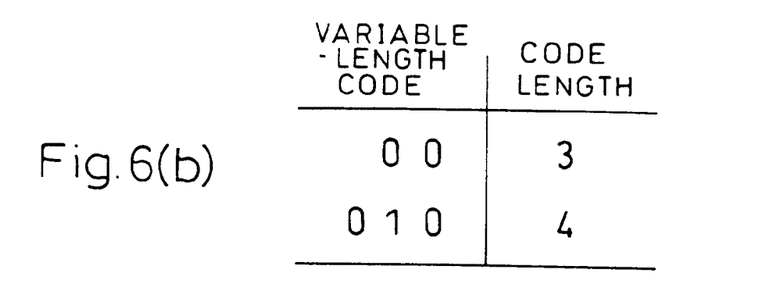
FIG. 6b shows corresponding relationships of low-order parts of variable-length codes versus code lengths thereof.
Figure 6C:
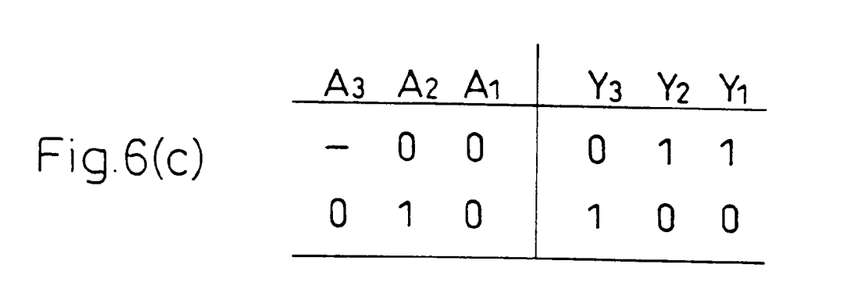
FIG. 6c shows corresponding relationships between input and output terminals of an AC code length table, low-order parts of variable-length codes, and code lengths thereof.
Figure 6D:
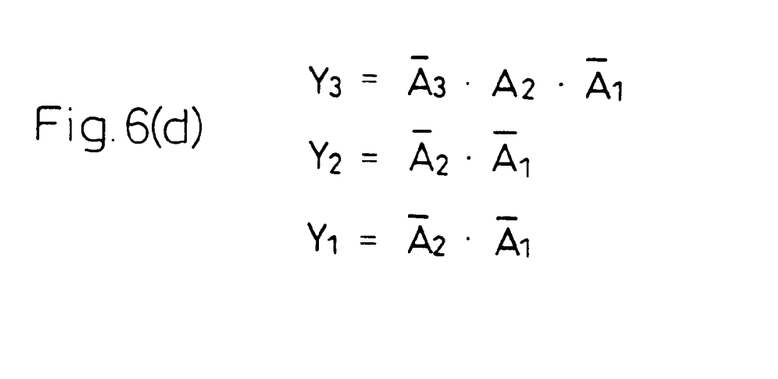
FIG. 6d is a logical formula showing corresponding relationships between low-order parts of variable-length codes and code lengths thereof.

Referring now to FIG. 6a, therein is illustrated an embodiment of the AC code length table 6 (the second logical table). FIG. 6a is an organization with respect to ZERORUN-VALUE combinations of FIG. 5, i.e., (0,1) and (0,2). As can be seen from FIG. 6b and from FIG. 5, the ZERORUN-VALUE combination (0,1) corresponds to [00] while the ZERORUN-VALUE combination (0,2) corresponds to [010], and corresponding code lengths are [3] and [4]. As shown in FIG. 6c, the AC code length table 6 has input terminals A3, A2, and A1 at which variable-length codes are applied and output terminals Y3, Y2, and Y1 at which code lengths are put out. The input terminals A3, A2, A1 and the output terminals Y3, Y2, Y1 are shown in corresponding relationship by logical formulas of FIG. 6d. If these logical formulas are constructed by means of a random logic of logical circuits, this results in the FIG. 6a organization.

If, as described above, the AC code length table 6 is constructed using a random logic, this not only provides fast table reference operations but also contributes to reducing the size of logical tables. The AC code length table 6 may be formed by RAMs or ROMs.

EMBODIMENT 2

Figure 3:
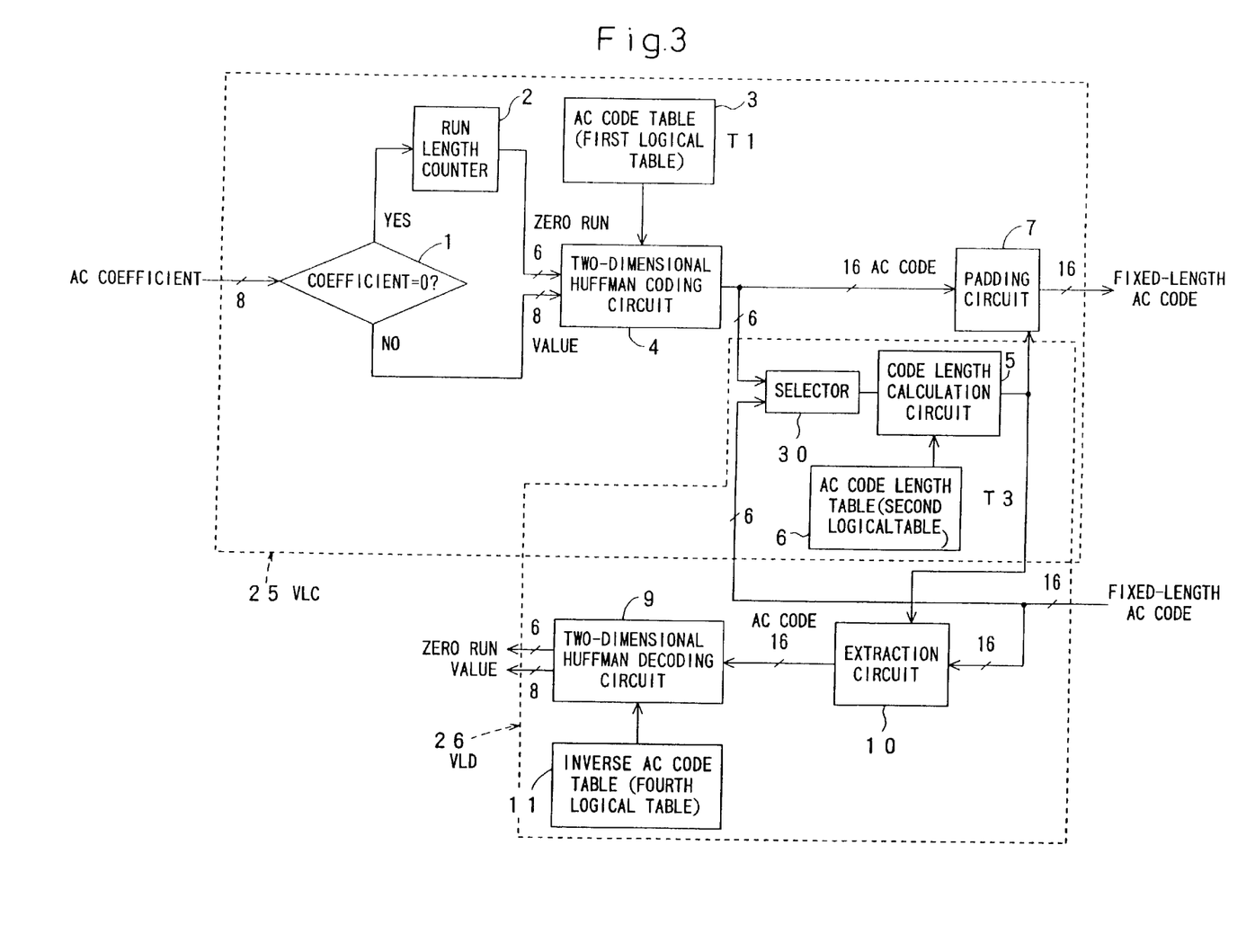
FIG. 3 is a diagram showing a variable-length coding circuit and a variable-length decoding circuit in accordance with a second embodiment of the present invention.

FIG. 3 shows main parts of a digital coding/decoding apparatus in accordance with a second embodiment of the resent invention. The entire organization of the present digital coding/decoding apparatus is identical with the one shown in FIG. 1, therefore the description thereof being omitted here.

25 is a VLC identical in configuration with the one described in the first embodiment VLC. 26 is a VLD. FIG. 3 is a diagram showing an internal organization of the VLC 25 as well as an internal organization of the VLD 26.

9 is a two-dimensional Huffman decoding circuit. 10 is an extraction circuit. 11 is an inverse AC code table (the fourth logical table). 5 is a code length calculation circuit. 6 is an AC code length table (the third logical table). The code length calculation circuit 5 and the AC code length table 6 are shared between the VLD 26 and the VLC 25. In other words, the code length calculation circuit 5 takes in a Huffman code at the coding time and at the decoding time, to calculate its code length with the aid of the AC code length table 6.

Arranged at a preceding stage to the code length calculation circuit 5 is a selector 30. The selector 30 is operable to select between a variable-length AC code from the two-dimensional Huffman coding circuit 4 of the VLC 25 and a fixed-length AC code taken in from outside the apparatus, thereafter providing a code selected to the code length calculation circuit 5. More specifically, the selector 30 selects a variable-length AC code from the two-dimensional Huffman coding circuit 4 at the coding time while it selects a fixed-length AC code taken in from outside the apparatus at the decoding time.

In the VLD 26, the code length calculation circuit 5 performs a calculation, to find a code length of a variable-length AC code contained in an external fixed-length AC code according to the AC code length table 6. The extraction circuit 10 accepts a fixed-length AC code and the code length thus found by the code length calculation circuit 5, to extract a variable-length AC code. The two-dimensional Huffman decoding circuit 9 is operable to transform such an extracted variable-length AC code into a ZERORUN-VALUE combination according to the inverse AC code table 11 (the fourth logical table).

In the present embodiment, the code length calculation circuit 5 and the AC code length table 6 are shared between the VLC 25 and the VLD 26. Therefore the present embodiment, compared with the first embodiment, can reduce the entire circuit size to a further extent and provides a low-power-dissipation digital coding/decoding apparatus.

The description has been made taking an example case where a DCT circuit as an orthogonal transform circuit and an IDCT as an inverse orthogonal transform circuit are used. However, any transform circuit capable of performing a Fourier transform, a discrete Fourier transform, an Hadamard transform, a Karhunen-Loeve transform, a discrete sine transform, a slant transform, or a Haar transform may be used as an orthogonal transform circuit, and any transform circuit capable of performing an inverse Fourier transform, an inverse discrete Fourier transform, an inverse Hadamard transform, an inverse Karhunen-Loeve transform, an inverse discrete sine transform, an inverse slant transform, or an inverse Haar transform may be used as an inverse orthogonal transform circuit.

The inverse quantizer 18 and the quantizer 15 each have irreversibilities. In other words, the inverse quantizer 18 is unable to completely restore the post-quantization data into the original one by means of inverse quantization. Therefore the inverse quantizer 18 and the quantizer 15 may be omitted in a digital coding/decoding apparatus giving importance to reversibility.

In the description, the coding circuit is formed by the Huffman coding circuit 4. However, the coding circuit may be formed by a calculation coding circuit. The decoding circuit is formed by the Huffman decoding circuit 9 in the description. However, the decoding circuit may be formed by a calculation decoding circuit.

The present invention finds applications in DVC and MPEG (the image processing standards specification).

The invention claimed is:

1. A digital coding apparatus comprising:
   an orthogonal transform circuit for performing an orthogonal transform on data to find a great number of transform coefficients, each of said transform coefficients having either a value of zero or a value other than zero;
   a variable-length coding circuit for converting transform coefficients from said orthogonal transform circuit into a variable-length code, for padding said variable-length code to a fixed-length code, and for providing said fixed-length code to outside said digital coding apparatus;
   said variable-length coding circuit including:
   a first logical table for storing, in corresponding relationship, combinations of the numbers of consecutive zero-valued transform coefficients and nonzero-valued transform coefficients, and variable-length codes;
   a coding circuit for receiving in sequence transform coefficients from said orthogonal transform circuit, and for converting, based on said first logical table, a combination of the number of consecutive zero-valued transform coefficients and a nonzero-valued transform coefficient of said received transform coefficients, into a variable-length code;
   a second logical table for storing variable-length codes and code lengths thereof in corresponding relationship;
   a code length calculation circuit for receiving a variable-length code from said coding circuit, and for calculating, based on said second logical table, a code length of said received variable-length code;
   a padding circuit for receiving a variable-length code from said coding circuit and a code length from said code length calculation circuit, and for padding, based on said received code length, said received variable-length code to a fixed-length code.

2. A digital coding apparatus according to claim 1, said second logical table being formed by a random logic comprising a plurality of logical circuits connected together.

3. A digital coding apparatus according to claim 1, said second logical table prestoring, in corresponding relationship, parts of variable-length codes to be inputted and code lengths thereof.

4. A digital coding apparatus according to claim 1, said orthogonal transform circuit being formed by a discrete cosine transform circuit capable of performing a discrete cosine transform on data.

5. A digital coding apparatus according to claim 1, said digital coding apparatus further comprising:
   a quantizer connected between said orthogonal transform circuit and said coding circuit;
   said quantizer quantizing a transform coefficient from said orthogonal transform circuit for forwarding to said coding circuit.

6. A digital coding apparatus according to claim 1,
   said coding circuit being formed by a Huffman coding circuit capable of converting a combination of the number of consecutive zero-valued transform coefficients and a nonzero-valued transform coefficient into a variable-length Huffman code.

7. A digital coding and decoding apparatus comprising:
   an orthogonal transform circuit for performing an orthogonal transform on data to find a great number of transform coefficients, each of said transform coefficients having either a value of zero or a value other than zero;
   a variable-length coding circuit for converting transform coefficients from said orthogonal transform circuit into a variable-length code, for padding said variable-length code to a fixed-length code, and for providing said fixed-length code to outside said digital coding and decoding apparatus;

a variable-length decoding circuit for receiving a fixed-length code from outside said digital coding and decoding apparatus, and for converting said received fixed-length code into a great number of transform coefficients, each of said transform coefficients having either a value of zero or a value other than zero;

an inverse orthogonal transform circuit for performing an inverse orthogonal transform on a zero-valued transform coefficient or a nonzero-valued transform coefficient from said variable-length decoding circuit;

said variable-length coding circuit including:

a first logical table for storing, in corresponding relationship, combinations of the numbers of consecutive zero-valued transform coefficients and nonzero-valued transform coefficients and variable-length codes;

a coding circuit for receiving in sequence transform coefficients from said orthogonal transform circuit, and for converting, based on said first logical table, a combination of the number of consecutive zero-valued transform coefficients and a nonzero-valued transform coefficient of said received transform coefficients, into a variable-length code;

a second logical table for storing variable-length codes and code lengths thereof in corresponding relationship;

a code length calculation circuit for receiving a variable-length code from said coding circuit, and for calculating, based on said second logical table, a code length of said received variable-length code;

a padding circuit for receiving a variable-length code from said coding circuit and a code length from said code length calculation circuit, and for padding, based on said received code length, said received variable-length code to a fixed-length code;

said variable-length decoding circuit including:

a third logical table for storing variable-length codes and code lengths thereof in corresponding relationship;

a code length calculation circuit for receiving a fixed-length code from outside said digital coding and decoding apparatus, and for calculating, based on said third logical table, a code length of a variable-length code contained in said received fixed-length code;

an extraction circuit for receiving a fixed-length code from outside said digital coding and decoding apparatus and a code length from said code length calculation circuit, and for extracting, based on said received code length, a variable-length code from said received fixed-length code;

a fourth logical table for storing, in corresponding relationship, variable-length codes and combinations of the numbers of consecutive zero-valued transform coefficients and nonzero-valued transform coefficients;

a decoding circuit for converting, based on said fourth logical table, a variable-length code from said extraction circuit into zero-valued and nonzero-valued transform coefficients.

8. A digital coding and decoding apparatus according to claim 7, said second logical table being formed by a random logic comprising a plurality of logical circuits connected together.

9. A digital coding and decoding apparatus according to claim 7, said code length calculation circuit of said variable-length coding circuit serving also as said code length calculation circuit of said variable-length decoding circuit;

said second logical table serving also as said third logical table.

10. A digital coding and decoding apparatus according to claim 9, said digital coding and decoding apparatus further comprising:

a selector for selecting between a variable-length code from said coding circuit and a fixed-length code taken in from outside said digital coding and decoding apparatus, wherein the former code is selected at the coding time for forwarding to said code length calculation circuit while the latter code is selected at the decoding time for forwarding to said code length calculation circuit.

11. A digital coding and decoding apparatus according to claim 7, said second logical table prestoring, in corresponding relationship, parts of variable-length codes to be inputted and code lengths thereof.

12. A digital coding and decoding apparatus according to claim 7, said orthogonal transform circuit being formed by a discrete cosine transform circuit capable of performing a discrete cosine transform on data.

13. A digital coding and decoding apparatus according to claim 12, said inverse orthogonal transform circuit being formed by an inverse discrete cosine transform circuit capable of performing an inverse discrete cosine transform on data.

14. A digital coding and decoding apparatus according to claim 7, said digital coding and decoding apparatus further comprising:

a quantizer connected between said orthogonal transform circuit and said coding circuit;

said quantization circuit quantizing a transform coefficient from said orthogonal transform circuit for forwarding to said coding circuit.

15. A digital coding and decoding apparatus according to claim 14, said digital coding and decoding apparatus further comprising an inverse quantizer connected between said decoding circuit and said inverse orthogonal transform circuit;

said inverse quantization circuit inverse-quantizing a zero-valued or nonzero-valued transform coefficient from said decoding circuit for forwarding to said inverse orthogonal transform circuit.

16. A digital coding and decoding apparatus according to claim 7, said coding circuit being formed by a Huffman coding circuit capable of converting a combination of the number of consecutive zero-valued transform coefficients and a nonzero-valued transform coefficient, into a variable-length Huffman code.

17. A digital coding and decoding apparatus according to claim 16, said decoding circuit being formed by a Huffman decoding circuit capable of converting a variable-length Huffman code into a combination of the number of consecutive zero-valued transform coefficients and a nonzero-valued transform coefficient.

18. A digital coding apparatus comprising:

an orthogonal transform circuit for performing an orthogonal transform on data to find a great number of transform coefficients, each of said transform coefficients having either a value of zero or a value other than zero;

a variable-length coding circuit for converting transform coefficients from said orthogonal transform circuit into a variable-length code;

said variable-length coding circuit including:

a first logical table for storing, in corresponding relationship, combinations of the numbers of consecutive zero-valued transform coefficients and nonzero-valued transform coefficients, and variable-length codes;

a coding circuit for receiving in sequence transform coefficients from said orthogonal transform circuit, and for converting, based on said first logical table, a combination of the number of consecutive zero-valued transform coefficients and a nonzero-valued transform coefficient of said received transform coefficients, into a variable-length code;

a second logical table for storing variable-length codes and code lengths thereof in corresponding relationship;

a code length calculation circuit for receiving a variable-length code from said coding circuit, and for calculating, based on said second logical table, a code length of said received variable-length code.

* * * * *